US012627004B2

(12) United States Patent　(10) Patent No.: US 12,627,004 B2

Sugimori et al.　(45) Date of Patent: May 12, 2026

(54) NONAQUEOUS ELECTROLYTE SECONDARY BATTERY

(71) Applicant: Panasonic Intellectual Property Management Co., Ltd., Osaka (JP)

(72) Inventors: Masanori Sugimori, Osaka (JP); Yasunori Baba, Hyogo (JP); Katsunori Yanagida, Hyogo (JP); Nobuhiro Hirano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 832 days.

(21) Appl. No.: 17/271,103

(22) PCT Filed: Feb. 25, 2019

(86) PCT No.: PCT/JP2019/006943
§ 371 (c)(1),
(2) Date: Feb. 24, 2021

(87) PCT Pub. No.: WO2020/044610
PCT Pub. Date: Mar. 5, 2020

(65) Prior Publication Data
US 2021/0257702 A1　Aug. 19, 2021

(30) Foreign Application Priority Data
Aug. 30, 2018　(JP) ................................. 2018-162075

(51) Int. Cl.
H01M 50/457　(2021.01)
H01M 50/409　(2021.01)
(Continued)

(52) U.S. Cl.
CPC ....... H01M 50/457 (2021.01); H01M 50/409 (2021.01); H01M 50/417 (2021.01);
(Continued)

(58) Field of Classification Search
CPC ............. H01M 50/457; H01M 50/497; H01M 50/417; H01M 50/443; H01M 50/431;
(Continued)

(56) References Cited

U.S. PATENT DOCUMENTS

2008/0096102 A1* 4/2008 Hatayama et al. ..... H01M 2/14
429/122
2014/0287294 A1* 9/2014 Lee et al. ................ H01M 2/14
(Continued)

FOREIGN PATENT DOCUMENTS

CN　106848149 A　6/2017
CN　107004806 A　* 8/2018 ............. H01M 2/16
(Continued)

OTHER PUBLICATIONS

"Seo, CN107004806A machine translation, 2017" (Year: 2017).*
(Continued)

*Primary Examiner* — Jonathan G Leong
*Assistant Examiner* — Kan Luo
(74) *Attorney, Agent, or Firm* — WHDA, LLP

(57) ABSTRACT

In a nonaqueous electrolyte secondary battery which is an example of the embodiment of the present invention, a separator comprises a porous base material, a first filler layer that includes phosphate particles and is formed on one side of the base material, and a second filler layer that includes inorganic particles which have a melting point that is higher than that of the phosphate particles and is formed on the other side of the base material. The volume-based 10% particle size ($D_{10}$) of the phosphate particles is 0.02 to 0.5 μm and is smaller than the average pore size of the base material. A portion of the phosphate particles penetrates into voids of the base material, and an average value of penetration depth of the particles is 0.1 to 2 μm.

7 Claims, 2 Drawing Sheets

(51) Int. Cl.

| | |
|---|---|
| *H01M 50/417* | (2021.01) |
| *H01M 50/431* | (2021.01) |
| *H01M 50/443* | (2021.01) |
| *H01M 50/489* | (2021.01) |
| *H01M 50/491* | (2021.01) |
| *H01M 50/497* | (2021.01) |

(52) U.S. Cl.
CPC ....... *H01M 50/431* (2021.01); *H01M 50/443* (2021.01); *H01M 50/497* (2021.01); *H01M 50/489* (2021.01); *H01M 50/491* (2021.01)

(58) Field of Classification Search
CPC ............. H01M 50/498; H01M 50/491; H01M 50/409; H01M 50/489
See application file for complete search history.

(56) References Cited

U.S. PATENT DOCUMENTS

| | | | |
|---|---|---|---|
| 2014/0356695 A1 | 12/2014 | Abe et al. | |
| 2015/0171490 A1* | 6/2015 | Kim et al. | H01M 10/653 |
| 2015/0372276 A1 | 12/2015 | Mizuno et al. | |
| 2016/0013465 A1* | 1/2016 | Akiike | H01M 2/16 |
| 2016/0204406 A1 | 7/2016 | Ryu et al. | |
| 2017/0117523 A1 | 4/2017 | Kim et al. | |
| 2020/0127265 A1* | 4/2020 | Min et al. | H01M 2/16 |

FOREIGN PATENT DOCUMENTS

| | | | | | |
|---|---|---|---|---|---|
| JP | 2014-180822 | A | | 9/2014 | |
| JP | 5774249 | B2 | | 9/2015 | |
| JP | 2016-72120 | A | | 5/2016 | |
| JP | 2016-534531 | A | | 11/2016 | |
| JP | 2017-063041 | A | | 3/2017 | |
| KR | 10-2014-0073957 | A | | 6/2014 | |
| WO | WO2018070473 | A | * 4/2018 | ............. | H01M 2/16 |
| WO | 2019/044308 | A1 | | 3/2019 | |
| WO | 2019/065062 | A1 | | 4/2019 | |

OTHER PUBLICATIONS

"Noguchi, WO2018070473A machine translation, 2018" (Year: 2018).*

Horold, Polymer green flame retardants, Chapter 6—Phosphorous-based and Intumescent Flame Retardants, Elsevier, 2014, pp. 221-254 (Year: 2014).*

English Translation of Search Report dated Jun. 6, 2022, issued in counterpart CN Application No. 201980030892.0. (4 pages).

English Translation of International Search Report dated May 21, 2019, issued in counterpart Application No. PCT/JP2019/006943.)(1 page).

\* cited by examiner

NONAQUEOUS ELECTROLYTE SECONDARY BATTERY

TECHNICAL FIELD

The present disclosure relates to a non-aqueous electrolyte secondary battery.

BACKGROUND ART

A non-aqueous electrolyte secondary battery such as a lithium ion battery may abnormally generate heat due to overcharging, an internal short circuit, an external short circuit, excessive resistance heating caused by a large current, or the like. Conventionally, a separator shutdown function has been known as one of the techniques for suppressing heat generation of a non-aqueous electrolyte secondary battery. The shutdown function is to block the ion conduction (movement of lithium ions) between the positive and negative electrodes by causing the separator to melt because of abnormal heat generation of a battery and closing pores of the separator, to thereby suppress further heat generation of the battery. For example, Patent Literatures 1 and 2 disclose a separator for a non-aqueous electrolyte secondary battery in which a layer including inorganic particles of aluminum oxide or the like is formed on the surface of a porous base material having a shutdown function.

CITATION LIST

Patent Literature

PATENT LITERATURE 1: Japanese Unexamined Patent Application Publication No. 2017-63041
PATENT LITERATURE 2: Japanese Patent Publication No. 5774249

SUMMARY

As described above, it is an important issue to suppress the heat generation of a battery by blocking the ion conduction between the positive and negative electrodes when the battery abnormally generates heat. However, conventional techniques including the techniques of Patent Literatures 1 and 2 may not be able to sufficiently block the ion conduction between the positive and negative electrodes. In recent years, with the demand for a higher capacity of a battery, thinning of the separator has been studied, but when the thickness of the separator becomes thin, it becomes difficult to exhibit the shutdown function, and meltdown becomes likely to occur. It is an advantage of the present disclosure to sufficiently block the ion conduction between the positive and negative electrodes when an abnormality occurs, to suppress further heat generation of the battery.

The non-aqueous electrolyte secondary battery which is one aspect of the present disclosure is a non-aqueous electrolyte secondary battery comprising a positive electrode, a negative electrode, and a separator interposed between the positive electrode and the negative electrode, wherein the separator includes a porous base material, a first filler layer including phosphate particles and formed on one surface of the base material, and a second filler layer including inorganic particles having a melting point higher than that of the phosphate particles and formed on the other surface of the base material. The volume-based 10% particle size ($D_{10}$) of the phosphate particles is 0.02 μm or more and 0.5 μm or less, and is smaller than the average pore size of the base material, and some of the phosphate particles enter pores of the base material, and the average value of the entry depth of the particles is 0.1 μm or more and 3 μm or less.

Advantageous Effect of Invention

According to the non-aqueous electrolyte secondary battery, which is one aspect of the present disclosure, it is possible to sufficiently suppress heat generation when an abnormality occurs. For example, it is possible to suppress the shrinkage of the separator when an abnormality occurs in the battery and maintain the shape of the separator that can exhibit the shutdown function.

DESCRIPTION OF EMBODIMENTS

Figure 1:
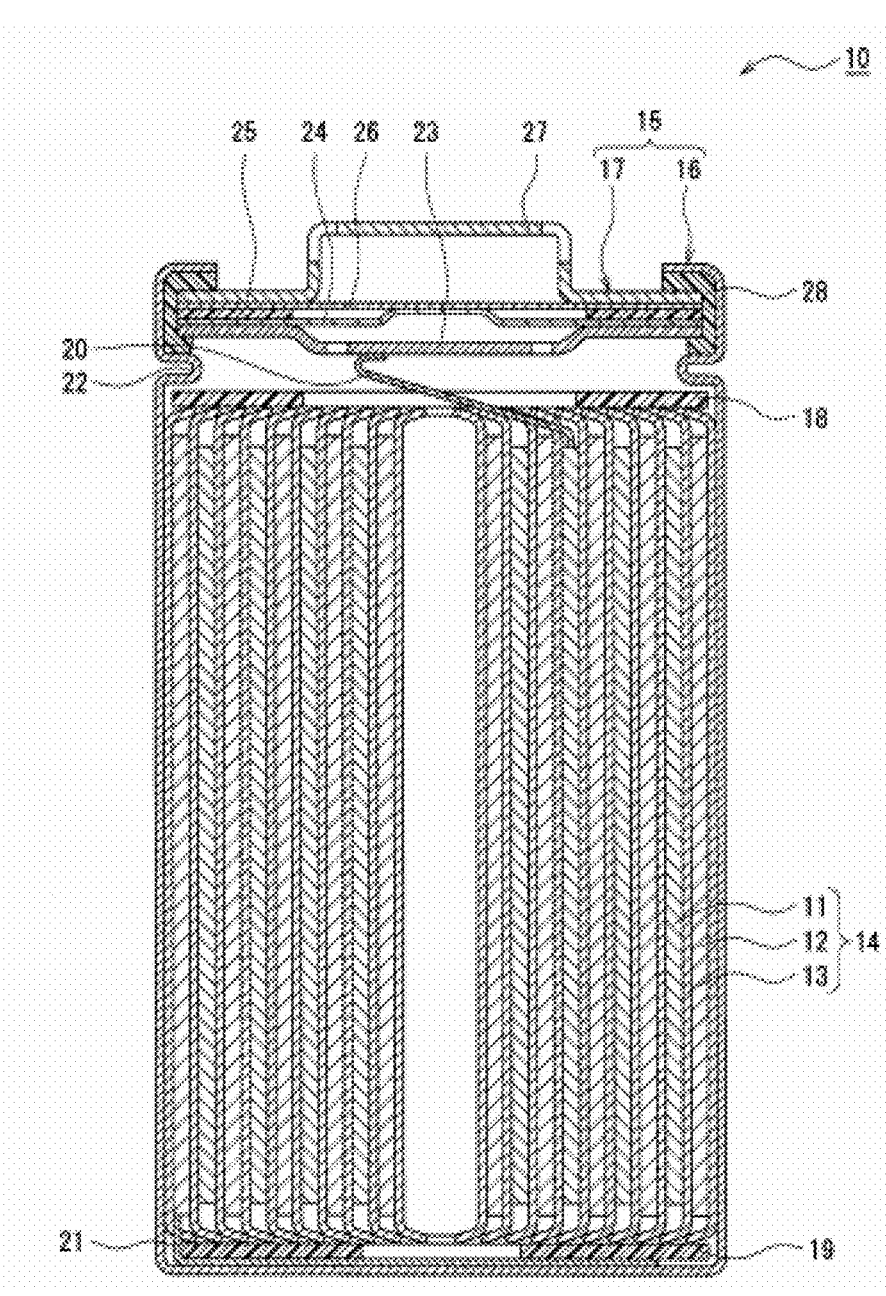
FIG. 1 is a cross-sectional view of a non-aqueous electrolyte secondary battery, which is an example of an embodiment.

As described above, a separator in which a filler layer including inorganic particles is formed on a porous resin base material is known. In general, the porous resin base material has a shutdown function. Therefore, when the battery abnormally generates heat, the shutdown function of the resin base material blocks the ion conduction between the positive and negative electrodes to suppress further heat generation of the battery. However, as the capacity and energy density of the battery increase, the temperature inside the battery becomes very high (for example, 200° C. or more) when an abnormality occurs, and the shape of the separator may not be able to be secured. Even if the meltdown is not reached, when the separator is greatly deformed by heat, the ion conduction or the like between the positive and negative electrodes cannot be sufficiently blocked, and it becomes difficult to suppress the heat generation of the battery.

In view of this situation, as a result of diligent studies by the present inventors, the present inventors have found that by using the above separator having a first filler layer, a second filler layer, and a base material in which some of the phosphate particles included in the first filler layer have entered pores within a specific depth range, when the battery abnormally generates heat, the shape of the separator that can exhibit the shutdown function can be maintained, and the ion conduction between the positive and negative electrodes can be sufficiently blocked. According to the non-aqueous electrolyte secondary battery according to the present disclosure, it is possible to suppress further heat generation of the battery when the battery abnormally generates heat.

In the non-aqueous electrolyte secondary battery according to the present disclosure, when the battery abnormally generates heat because of a short circuit or the like, the phosphate particles included in the first filler layer melt and polycondense with the heat and the potential of the positive electrode as accelerating factors, to form an inert film (polyphosphate film) on the surface of the positive electrode, and the polyphosphate fills pores of the base material. At this time, the second filler layer secures the shape of the separator that can exhibit the shutdown function. Further, the phosphate particles that have entered the pores of the base material, for example, suppress the heat shrinkage of the base material to contribute to the shape stability of the separator, and efficiently closes the pores of the base material. Because of this, the movement of lithium ions between the positive and negative electrodes is quickly blocked, and the exothermic reaction at the time of a short circuit is sufficiently suppressed. On the other hand, as a result of a study by the present inventors, it has been found that when the amount of phosphate particles entering pores of the base material becomes too large, the heat generation becomes large rather than small.

By the temperature rise inside the battery due to an internal short circuit of the battery, for example, a flammable or oxidizing gas (oxygen, hydrogen, or the like) is generated from one electrode, and the gas moves to the other electrode and reacts, and this also accelerates the heat generation of the battery. According to the non-aqueous electrolyte secondary battery according to the present disclosure, the movement of the gas can be sufficiently blocked.

Hereinafter, an example of an embodiment of the non-aqueous electrolyte secondary battery according to the present disclosure will be described in detail. In the following, a cylindrical battery in which a wound electrode assembly 14 is housed in a cylindrical battery case will be illustrated, but the electrode assembly is not limited to the wound type, and may be a stacked type in which a plurality of positive electrodes and a plurality of negative electrodes are alternately stacked one by one on each other via a separator. In addition, the battery case is not limited to a cylindrical shape, and may be a metal case such as a rectangular (rectangular battery) or a coin-shaped (coin-shaped battery), a resin case (laminated battery) made of a resin film, or the like.

FIG. 1 is a cross-sectional view of a non-aqueous electrolyte secondary battery 10, which is an example of an embodiment. As illustrated in FIG. 1, the non-aqueous electrolyte secondary battery 10 comprises an electrode assembly 14, a non-aqueous electrolyte, and a battery case 15 that houses the electrode assembly 14 and the non-aqueous electrolyte. The electrode assembly 14 comprises a positive electrode 11, a negative electrode 12, and a separator 13 interposed between the positive electrode 11 and the negative electrode 12. The electrode assembly 14 has a wound structure in which the positive electrode 11 and the negative electrode 12 are wound via a separator 13. The battery case 15 is composed of a bottomed cylindrical outer can 16 and a sealing assembly 17 that closes the opening of the outer can 16.

The non-aqueous electrolyte includes a non-aqueous solvent and an electrolyte salt dissolved in the non-aqueous solvent. As the non-aqueous solvent, for example, an ester, an ether, a nitrile, an amide, a mixed solvent of two or more thereof, or the like may be used. The non-aqueous solvent may contain a halogen replacement in which at least a part of hydrogen in these solvents is replaced with a halogen atom such as fluorine. The non-aqueous electrolyte is not limited to a liquid electrolyte, and may be a solid electrolyte. As the electrolyte salt, for example, a lithium salt such as $LiPF_6$ is used.

The non-aqueous electrolyte secondary battery 10 comprises insulating plates 18 and 19 disposed above and below the electrode assembly 14, respectively. In the example shown in FIG. 1, a positive electrode lead 20 attached to the positive electrode 11 extends to the sealing assembly 17 side through through-holes of the insulating plate 18, and a negative electrode lead 21 attached to the negative electrode 12 passes through the outside of the insulating plate 19 to extend to the bottom side of the outer can 16. The positive electrode lead 20 is connected to the lower surface of a bottom plate 23, which is the bottom plate of the sealing assembly 17, by welding or the like, and a cap 27, which is the top plate of the sealing assembly 17 electrically connected to the bottom plate 23, serves as a positive electrode terminal. The negative electrode lead 21 is connected to the inner surface of the bottom of the outer can 16 by welding or the like, and the outer can 16 serves as a negative electrode terminal.

The outer can 16 is, for example, a bottomed cylindrical metal container. A gasket 28 is provided between the outer can 16 and the sealing assembly 17 to secure the airtightness inside the battery. The outer can 16 has, for example, a grooved part 22 that supports the sealing assembly 17 with a part of the side surface portion projecting inward. The grooved part 22 is preferably formed in an annular shape along the circumferential direction of the outer can 16, and supports the sealing assembly 17 on the upper surface thereof.

The sealing assembly 17 has a structure in which the bottom plate 23, a lower vent member 24, an insulating member 25, an upper vent member 26, and the cap 27 are stacked in this order from the electrode assembly 14 side. Members constituting the sealing assembly 17 each have, for example, a disk shape or a ring shape, and members except for the insulating member 25 are electrically connected to each other. The lower vent member 24 and the upper vent member 26 are connected to each other at the central portions thereof, and the insulating member 25 is interposed between the peripheral portions thereof. When the internal pressure of the battery rises due to abnormal heat generation, the lower vent member 24 deforms and breaks in such a way as to push up the upper vent member 26 toward the cap 27 side, and the current path between the lower vent member 24 and the upper vent member 26 is blocked. When the internal pressure further rises, the upper vent member 26 breaks and a gas is discharged from the opening of the cap 27.

Figure 2:
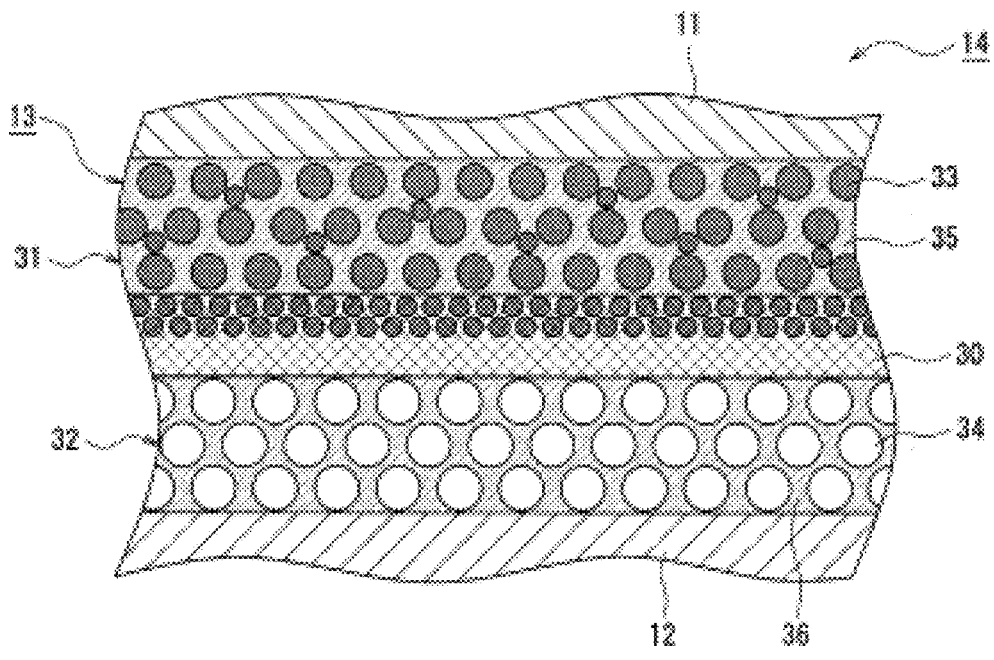
FIG. 2 is a cross-sectional view of an electrode assembly, which is an example of an embodiment.

Hereinafter, the electrode assembly 14 and particularly the separator 13 will be described in detail with reference to FIG. 2. FIG. 2 is a cross-sectional view of the electrode assembly 14, in which a part of the cross section of the separator 13 is enlarged and shown.

[Positive Electrode]

The positive electrode 11 comprises a positive electrode current collector and a positive electrode mixture layer formed on the current collector. As the positive electrode current collector, a foil of a metal stable in the potential range of the positive electrode 11 such as aluminum, a film in which the metal is disposed on the surface layer, or the like can be used. The positive electrode mixture layer includes a positive electrode active material, a conductive agent, and a binder, and is preferably formed on both sides of the positive electrode current collector. The positive electrode 11 can be produced by applying a positive electrode mixture slurry including a positive electrode active material, a conductive agent, a binder, and the like onto a positive electrode current collector, drying the coating film, and then rolling it to form a positive electrode mixture layer on both sides of the positive electrode current collector. From the viewpoint of increasing the capacity of the battery, the density of the positive electrode mixture layer is 3.6 g/cc or more, and preferably 3.6 g/cc or more and 4.0 g/cc or less.

Examples of the positive electrode active material include a lithium metal composite oxide containing a metal element such as Co, Mn, Ni, or Al. Examples of the lithium metal composite oxide include $Li_xCoO_2$, $Li_xNiO_2$, $Li_xMnO_2$, $Li_x$-$Co_yNi_{1-y}O_2$, $Li_xCo_yM_{1-y}O_2$, $Li_xNi_{1-y}M_yO_z$, $Li_xMn_2O_4$, $Li_xMn_{2-y}M_yO_4$, $LiMPO_4$, and $Li_2MPO_4F$ (M; at least one of Na, Mg, Sc, Y, Mn, Fe, Co, Ni, Cu, Zn, Al, Cr, Pb, Sb, and B, $0.95 \leq x \leq 1.2$, $0.8 < y \leq 0.95$, $2.0 \leq z \leq 2.3$).

Examples of the conductive agent included in the positive electrode mixture layer include a carbon material such as carbon black, acetylene black, ketjen black, graphite, a carbon nanotube, a carbon nanofiber, and graphene. Examples of the binder included in the positive electrode mixture layer include a fluorine-containing resin such as polytetrafluoroethylene (PTFE) or polyvinylidene fluoride (PVdF), polyacrylonitrile (PAN), a polyimide, an acrylic resin, and a polyolefin. In addition, these resins may be used in combination with carboxymethyl cellulose (CMC) or a salt thereof, polyethylene oxide (PEO), or the like.

[Negative Electrode]

The negative electrode 12 comprises a negative electrode current collector and a negative electrode mixture layer formed on the current collector. As the negative electrode current collector, a foil of a metal stable in the potential range of the negative electrode 12 such as copper, a film in which the metal is disposed on the surface layer, or the like can be used. The negative electrode mixture layer includes a negative electrode active material and a binder, and is preferably formed on both sides of the negative electrode current collector. The negative electrode 12 can be produced by applying a negative electrode mixture slurry including a negative electrode active material, a binder, and the like onto a negative electrode current collector, drying the coating film, and then rolling it to form a negative electrode mixture layer on both sides of the negative electrode current collector.

The negative electrode active material is not particularly limited as long as the negative electrode active material can reversibly intercalate and deintercalate lithium ions, and for example, a carbon material such as natural graphite or artificial graphite, a metal that is alloyed with Li such as silicon (Si) or tin (Sn), an oxide containing a metal element such as Si or Sn, or the like can be used. In addition, the negative electrode mixture layer may include a lithium titanium composite oxide. The lithium titanium composite oxide functions as a negative electrode active material. When a lithium titanium composite oxide is used, a conductive agent such as carbon black is preferably added to the negative electrode mixture layer.

As the binder contained in the negative electrode mixture layer, a fluorine-containing resin such as PTFE or PVdF, PAN, a polyimide, an acrylic resin, a polyolefin, or the like can be used as in the case of the positive electrode 11. When a negative mixture slurry is prepared using an aqueous solvent, as the binder, CMC or a salt thereof, styrene-butadiene rubber (SBR), polyacrylic acid (PAA) or a salt thereof, polyvinyl alcohol (PVA), or the like can be used.

[Separator]

As illustrated in FIG. 2, the separator 13 has a porous base material 30, a first filler layer 31, and a second filler layer 32. The first filler layer 31 includes phosphate particles 33 and is formed on one surface (first surface) of the base material 30. The second filler layer 32 includes inorganic particles 34 having a melting point higher than that of the phosphate particles 33 and is formed on the other surface (second surface) of the base material 30. The melting and polycondensation of the phosphate particles 33 included in the first filler layer 31 are caused not only by the heat at the time of the occurrence of an abnormality of the battery but also by the potential of the positive electrode 11. Because of this, the separator 13 is preferably disposed between the positive electrode 11 and the negative electrode 12 such that the first filler layer 31 faces the positive electrode 11 side. In addition, the first filler layer 31 is preferably in contact with the surface of the positive electrode 11.

As will be described in detail later, the volume-based 10% particle size ($D_{10}$) of the phosphate particles 33 is 0.02 μm or more and 0.5 μm or less, and is smaller than the average pore size of the base material 30. In addition, in the separator 13, some of the phosphate particles 33 enter pores of the base material 30, and the average value of the entry depth of the particles is 0.1 μm or more and 3 μm or less.

In the example shown in FIG. 2, the base material 30 is sandwiched between the first filler layer 31 and the second filler layer 32. The separator 13 has a three-layer structure in which the first filler layer 31/the base material 30/the second filler layer 32 are stacked in this order from the positive electrode 11 side. The separator 13 may have a plurality of each filler layer as long as the advantage of the present disclosure is not impaired, and may have another layer other than the first filler layer 31 and the second filler layer 32. For example, the first filler layer 31 may be formed directly on a second surface of the base material 30, or may be formed on the second surface of the base material 30 via the second filler layer 32. However, in any form, the first filler layer 31 is directly formed on a first surface of the base material 30. The surface of the first filler layer 31 is preferably free of another layer that inhibits contact with the positive electrode 11. Here, the surface of the first filler layer 31 means the surface of the first filler layer 31 on the positive electrode 11 side unless otherwise specified.

The base material 30 is composed of a porous sheet having ion permeability and insulating properties, such as a microporous thin film, a woven fabric, and a non-woven fabric. Examples of the resin constituting the base material 30 include a polyolefin such as polyethylene, polypropylene, or a copolymer of polyethylene and α-olefin, acrylic resin, polystyrene, polyester, and cellulose. The base material 30 may be composed of, for example, a polyolefin as a main component, and may be composed substantially only of a polyolefin. The base material 30 may have a single-layer structure or a stacked structure. The thickness of the base material 30 is not particularly limited, and is preferably, for example, 3 μm or more and 20 μm or less.

The porosity of the base material 30 is preferably, for example, 30% or more and 70% or less in terms of securing ion conductivity during charging and discharging of the battery. The porosity of the base material 30 is measured by the following method.

(1) Ten points of the base material 30 are punched into a circle having a diameter of 2 cm, and the thickness h and the mass w of the central portion of each punched small piece of the base material 30 are each measured.

(2) From the thickness h and the mass w, the volume V and the mass W of the 10 small pieces are determined, and the porosity & is calculated from the following expression.

$$\text{Porosity } \varepsilon(\%) = ((\rho V - W)/(\rho V)) \times 100$$

ρ: Density of a material constituting the base material

The average pore size of the base material 30 is, for example, 0.01 μm or more and 0.5 μm or less, and preferably 0.03 μm or more and 0.3 μm or less. The average pore size of the base material 30 is measured using a palm porometer (manufactured by Seika Corporation) that can measure the pore size by the bubble point method (JIS K3832, ASTM F316-86). The maximum pore size of the base material 30 is, for example, 0.05 µm or more and 1 µm or less, and preferably 0.05 µm or more and 0.5 µm or less.

The first filler layer 31 is a porous layer including the phosphate particles 33 and a first binder 35, and pores through which lithium ions pass are formed in gaps between the phosphate particles 33. The phosphate particles 33 melt and polycondense with the heat and the potential of the positive electrode 11 as accelerating factors when, for example, a charged battery abnormally generates heat, thereby an inactive polyphosphate film is formed on the surface of the positive electrode 11, and also the polyphosphate fills pores of the base material 30, thereby blocking the ion conduction between the positive and negative electrodes, to suppress further heat generation. The pores are closed by melting of the base material 30 itself as well.

The porosity of the first filler layer 31 is preferably 30% or more and 70% or less from the viewpoint of securing good ion conductivity, physical strength, and the like during charging and discharging of the battery. The porosity of the first filler layer 31 is calculated by the following expression (the same also applies to the second filler layer 32).

$$\text{Porosity (\%) of the first filler layer} = 100 - [W/(d \times \rho)] \times 100$$

W: Basis weight of the first filler layer (g/cm$^2$)
d: Thickness of the first filler layer (cm)
$\rho$: Average density of the first filler layer (g/cm$^3$)

Examples of the phosphate particles 33 include $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, and $MgHPO_4$. Among these, at least one selected from lithium phosphate ($Li_3PO_4$), dilithium hydrogen phosphate ($Li_2HPO_4$), and lithium dihydrogen phosphate ($LiH_2PO_4$) is preferable from the viewpoint of suppressing a side reaction and the like.

In general, the phosphate particles 33 preferably melt at a temperature of about 140° C. to 190° C. in consideration of the temperature applied when the battery is manufactured, the temperature inside the battery when the battery is normally used, and the temperature inside the battery when the battery is in an abnormal state.

The BET specific surface area of the phosphate particles 33 is preferably 5 m$^2$/g or more and 100 m$^2$/g or less, and more preferably 20 m$^2$/g or more and 100 m$^2$/g or less. The BET specific surface area is measured according to the BET method (nitrogen adsorption method) of JIS R1626. Phosphate particles 33 having a BET specific surface area in the above range easily melt at a temperature of about 140° C. to 190° C., and thus, by using the particles, the phosphate that has melted and polycondensed at the time of abnormal heat generation of the battery can quickly cover the surface of the positive electrode 11 and quickly close pores of the base material 30.

The volume-based 10% particle size ($D_{10}$) of the phosphate particles 33 is 0.02 µm or more and 0.5 µm or less, and preferably 0.03 µm or more and 0.3 µm or less, and is smaller than the average pore size of the base material 30. In this case, some of the phosphate particles 33 enter pores of the base material 30 to improve the effect of suppressing heat generation when an abnormality occurs.

Here, the volume-based 10% particle size ($D_{10}$) means the particle size at which the integrated volume value is 10% in the particle size distribution of the phosphate particles 33. The 50% particle size ($D_{50}$) and the 90% particle size ($D_{90}$), which will be described later, mean the particle sizes at which the volume integrated values are 50% and 90% in the particle size distribution, respectively. The 50% particle size ($D_{50}$) is also referred to as the median diameter. The particle size distribution of the phosphate particles 33 is measured by a laser diffraction method (laser diffraction/scattering type particle size distribution measuring instrument). Hereinafter, unless otherwise specified, the 10% particle size, the 50% particle size, and the 90% particle size mean volume-based particle sizes.

The 50% particle size ($D_{50}$) of the phosphate particles 33 is, for example, 0.05 µm or more and 1 µm or less. When the 50% particle size ($D_{50}$) of the phosphate particles 33 is out of the range, the amount of heat generated at the time of the occurrence of an abnormality in the battery may be larger than when the 50% particle size ($D_{50}$) of the phosphate particles 33 is within the range. A preferable 50% particle size ($D_{50}$) of the phosphate particles 33 is 0.1 µm or more and 1 µm or less, and may be smaller than the average pore size of the base material 30.

The 90% particle size ($D_{90}$) of the phosphate particles 33 is preferably larger than the average pore size of the base material 30. The 90% particle size ($D_{90}$) is, for example, 0.2 µm or more and 2 µm or less, and preferably 0.5 µm or more and 1.5 µm or less. When Doo is within the range, the amount of the phosphate particles 33 entering pores of the base material 30 can be adjusted to an appropriate range to improve the effect of suppressing heat generation at the time of the occurrence of an abnormality. If the depth to which the phosphate particles 33 enter the inside of the base material 30 becomes too deep, the heat generation becomes large rather than small.

In the separator 13, as described above, some of the phosphate particles 33 enter pores of the base material 30, and the average value of the entry depth of the particles is 0.1 µm or more and 3 µm or less. The average value of the entry depth of the phosphate particles 33 is preferably 0.2 µm or more and 2.5 µm or less, more preferably 0.4 µm or more and 2.0 µm or less, and particularly preferably 0.5 µm or more and 1.5 µm or less.

Here, the entry depth of the phosphate particles 33 is the length in the thickness direction of the separator 13 from the first surface of the base material 30 to the end opposite to the first surface of each particle that has entered the inside of the base material 30. The entry depth can be measured by observing the cross section of the base material 30 using a scanning electron microscope (SEM) or a transmission electron microscope (TEM).

The phosphate particles 33 preferably enter pores in substantially the entire first surface of the base material 30. That is, the phosphate particles 33 that have entered pores are substantially uniformly present on the first surface of the base material 30. In addition, the entry depth of the phosphate particles 33 is preferably substantially uniform over substantially the entire first surface of the base material 30. In this case, the effect of suppressing heat generation when an abnormality occurs can be stably obtained.

The average value of the entry depth of the phosphate particles 33 is, for example, 1% or more and 50% or less, and preferably 5% or more and 30% or less, based on the thickness of the base material 30. By adjusting the 10% particle size ($D_{10}$) of the phosphate particles 33 or the like according to the average pore size of the base material 30, the depth of the phosphate particles 33 entering the inside of the base material 30 can be controlled to be in the optimum range from the viewpoint of suppressing heat generation.

The content of the phosphate particles 33 is preferably an amount sufficient to close pores of the base material 30, and is at least 50% by mass, and preferably 50% by mass or more and 98% by mass or less based on the total mass of the first filler layer 31. The first filler layer 31 is composed substantially only of the phosphate particles 33 and the first binder 35. The proportion of the content of the first binder 35 is, for example, 2% by mass or more and 8% by mass or less based on the total mass of the first filler layer 31.

Examples of the first binder 35 include a polyolefin such as polyethylene, polypropylene, or a copolymer of polyethylene and α-olefin, a fluorine-containing resin such as PVdF, PTFE, or polyvinyl fluoride (PVF), a fluorine-containing rubber such as vinylidene fluoride-hexafluoropropylene-tetrafluoroethylene copolymer or ethylene-tetrafluoroethylene copolymer, styrene-butadiene copolymer and a hydride thereof, acrylonitrile-butadiene copolymer and a hydride thereof, acrylonitrile-butadiene-styrene copolymer and a hydride thereof, methacrylate-acrylate copolymer, styrene-acrylate copolymer, acrylonitrile-acrylate copolymer, polyvinyl acetate, polyphenylene ether, polysulfone, polyether sulfone, polyphenylene sulfide, polyether imide, polyamideimide, polyamide, poly N-vinylacetamide, polyester, polyacrylonitrile, cellulose, ethylene-vinyl acetate copolymer, polyvinyl chloride, isoprene rubber, butadiene rubber, polymethyl acrylate, polyethyl acrylate, polyvinyl alcohol, CMC, acrylamide, PVA, methyl cellulose, guar gum, sodium alginate, carrageenan, xanthan gum, and salts thereof.

The thickness of the first filler layer 31 is not particularly limited, and is preferably 1 μm or more and 10 μm or less, more preferably 1 μm or more and 5 μm or less, and particularly preferably 2 μm or more and 4 μm or less. From the viewpoint of suppressing the amount of heat generated in the battery, the thickness of the first filler layer 31 is preferably 2 times or more and 40 times or less and more preferably 3 times or more and 20 times or less the $D_{50}$ (median diameter) of the phosphate particles 33.

The first filler layer 31 may further include a heteropolyacid. It is considered that the addition of a heteropolyacid promotes polycondensation of the molten phosphate. Examples of the heteropolyacid include phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, and silicomolybdotungstovanadic acid.

The first filler layer 31 can be formed by applying a slurry-like composition including the phosphate particles 33, the first binder 35, and a dispersion medium (a solvent that dissolves the first binder 35) (a first slurry) onto the surface of the base material 30 and drying the coating film. The first slurry can be applied by a conventionally known method such as a gravure printing method. In order to cause some of the phosphate particles 33 to enter pores of the base material 30 and to adjust the average value of the entry depth of the particles to 0.1 μm or more and 3 μm or less, at least phosphate particles 33 having a 10% particle size ($D_{10}$) smaller than the average pore size of the base material 30 needs to be used.

The entry depth of the phosphate particles 33 can be controlled by adjusting the particle size of the phosphate particles 33, and also the type of the dispersion medium included in the first slurry, the drying conditions of the coating film of the first slurry, a method of applying the first slurry, and a combination thereof. For example, when a dispersion medium having good affinity for the base material 30 is used, or when the drying conditions of the coating film are relaxed, the phosphate particles 33 easily enter the inside of the base material 30. In addition, the entry depth of the phosphate particles 33 can also be controlled by adjusting the rotation speed of the gravure roll used for applying the first slurry. When the rotation speed of the gravure roll is slowed down, the phosphate particles 33 easily enter the inside of the base material 30.

The second filler layer 32 is a porous layer including the inorganic particles 34 having a high melting point (heat resistance) and a second binder 36, in which pores through which lithium ions pass are formed in gaps between the inorganic particles 34. The porosity of the second filler layer 32 is preferably 30% or more and 70% or less, as in the case of the first filler layer 31. The second filler layer 32 has the function of suppressing the base material 30 from being greatly deformed by abnormal heat generation of the battery and improving the shape stability of the separator 13. By providing the second filler layer 32 which is a heat-resistant layer, the shutdown effect of the base material 30 is improved, and the exothermic reaction at the time of a short circuit is sufficiently suppressed.

The inorganic particles 34 may be particles having a higher melting point, thermal decomposition temperature, and the like than the phosphate particles 33 included in the first filler layer 31, and may be composed of an insulating inorganic compound that does not melt or decompose when the battery abnormally generates heat. An example of the inorganic particles 34 is particles of a metal oxide, a metal oxide hydrate, a metal hydroxide, a metal nitride, a metal carbide, a metal sulfide, or the like. The $D_{50}$ of the inorganic particles 34 is, for example, 0.2 μm or more and 2 μm or less, and is larger than the median diameter of the phosphate particles 33. When the median diameter of the inorganic particles 34 does not satisfy the above range, the amount of heat generated at the time of abnormal heat generation may become larger than when the above range is satisfied.

Examples of the metal oxide and the metal oxide hydrate include aluminum oxide (alumina), boehmite ($Al_2O_3H_2O$ or AlOOH), magnesium oxide, titanium oxide, zirconium oxide, silicon oxide, yttrium oxide, and zinc oxide. Examples of the metal nitride include silicon nitride, aluminum nitride, boron nitride, and titanium nitride. Examples of the metal carbide include silicon carbide and boron carbide. Examples of the metal sulfide include barium sulfate. Examples of the metal hydroxide include aluminum hydroxide. The melting point of a substance such as boehmite, which melts after being modified to alumina, may be higher than the melting point of the phosphate particles 33.

In addition, the inorganic particles 34 may be particles of a porous aluminosilicate such as zeolite ($M_{2/n}O \cdot Al_2O_{3-x} \cdot SiO_{2-y} \cdot H_2O$, M is a metal element, x≥2, y≥0), a layered silicate such as talc ($Mg_3Si_4O_{10}(OH)_2$), barium titanate ($BaTiO_3$), strontium titanate ($SrTiO_3$), or the like. Among these, at least one selected from aluminum oxide, boehmite, talc, titanium oxide, and magnesium oxide is preferable from the viewpoint of insulation and heat resistance.

The content of the inorganic particles 34 is preferably 90% by mass or more, and more preferably 92% by mass or more and 98% by mass or less, based on the total mass of the second filler layer 32. The second filler layer 32 is composed substantially only of the inorganic particles 34 and the second binder 36. The content of the binder in the second filler layer 32 is, for example, 2% by mass or more and 8% by mass or less. The same resin as that for the first binder 35 can be used for the second binder 36. The thickness of the second filler layer 32 is not particularly limited, and is preferably 1 μm or more and 5 μm or less, and particularly preferably 2 μm or more and 4 μm or less.

The second filler layer 32 can be formed by applying a slurry-like composition including the inorganic particles 34, the second binder 36, and a dispersion medium (a solvent that dissolves the second binder 36) (a second slurry) onto the surface of the base material 30 and drying the coating film, as in the case of the first filler layer 31. As the dispersion medium, for example, NMP can be used.

EXAMPLES

Hereinafter, the present disclosure will be further described with reference to Examples, but the present disclosure is not limited to these Examples.

Example 1

[Production of Separator]
A separator having a three-layer structure composed of a first filler layer including phosphate particles/a porous base material made of polyethylene/a second filler layer including alumina particles was produced according to the following procedure.
(1) Preparation of First Slurry
Lithium phosphate particles ($Li_3PO_4$) having a BET specific surface area of 54.07 $m^2$/g, a $D_{10}$ of 0.15 μm, a $D_{50}$ of 0.26 μm, and a Doo of 0.57 μm, and poly N-vinylacetamide were mixed at a mass ratio of 92:8, and N-methyl-2-pyrrolidone (NMP) was added to prepare a first slurry having a solid concentration of 15% by mass.
(2) Preparation of Second Slurry
Alumina particles and poly N-vinylacetamide were mixed at a mass ratio of 100:6.5, and NMP was added to prepare a second slurry having a solid concentration of 15% by mass.
(3) Formation of First Filler Layer
The first slurry was applied to one surface of a single-layer polyethylene porous base material having a thickness of 12 μm by a gravure coating method such that the layer thickness after drying was 2 μm, and the coating film was dried at 60° C. for 5 minutes to form a first filler layer. At this time, the speed ratio between the rotation speed of the gravure roll and the transport speed of the porous base material (rotation speed of gravure roll/transport speed of porous base material (=3 m/min)) was set to 1.2. The slower the speed ratio, the greater the entry depth of the phosphate particles.
(4) Formation of Second Filler Layer
The second slurry was applied to the other surface of the porous base material by a gravure coating method such that the layer thickness after drying was 2 μm, and the coating film was dried at 60° C. for 5 minutes to form a second filler layer.
[Production of Positive Electrode]
As the positive electrode active material, lithium composite oxide particles represented by $Li_{1.05}Ni_{0.82}Co_{0.15}Al_{0.03}O_2$ were used. The positive electrode active material, carbon black, and PVdF were mixed in NMP at a mass ratio of 100:1:1 to prepare a positive electrode mixture slurry. Next, the positive electrode mixture slurry was applied to both sides of a positive electrode current collector made of aluminum foil, the coating film was dried, then it was rolled using a rolling roller, and further an aluminum current collector tab was attached to produce a positive electrode having positive electrode mixture layers formed on both sides of the current collector. The filling density of the positive electrode mixture was 3.70 $g/cm^3$.

[Production of Negative Electrode]
Artificial graphite, sodium carboxymethyl cellulose (CMC-Na), and a dispersion of styrene-butadiene rubber (SBR) were mixed in water at a solid mass ratio of 98:1:1 to prepare a negative electrode mixture slurry. Next, the negative electrode mixture slurry was applied to both sides of a negative electrode current collector made of copper foil, the coating film was dried, then it was rolled using a rolling roller, and further a nickel current collector tab was attached to produce a negative electrode having negative electrode mixture layers formed on both sides of the negative electrode current collector. The filling density of the negative electrode mixture was 1.70 $g/cm^3$.
[Preparation of Non-Aqueous Electrolyte]
In a mixed solvent in which ethylene carbonate (EC), ethyl methyl carbonate (EMC), and dimethyl carbonate (DMC) were mixed at a volume ratio of 3:3:4, lithium hexafluorophosphate ($LiPF_6$) was dissolved in such a way as to reach a concentration of 1 mol/liter. Further, vinylene carbonate (VC) was dissolved in the above mixed solvent at a concentration of 1% by mass to prepare a non-aqueous electrolyte.
[Production of Non-Aqueous Electrolyte Secondary Battery]
The positive electrode and the negative electrode were wound via the separator and then heat-pressed at 80° C. to produce a flat wound electrode assembly. At this time, the separator was disposed with the surface on which the first filler layer was formed facing the positive electrode such that the first filler layer was in contact with the surface of the positive electrode. The electrode assembly was housed in a battery outer body made of an aluminum laminate sheet, the above non-aqueous electrolyte was injected, and then the outer body was sealed to produce a 750-mAh non-aqueous electrolyte secondary battery.
[Nail Piercing Test]
The non-aqueous electrolyte secondary battery was charged in an environment of 25° C. at a constant current of 150 mA until the battery voltage reached 4.2 V, and then charged at a constant voltage of 4.2 V until the current value reached 37.5 mA. In an environment of 25° C., the tip of a round nail having a size of 3 mmφ was caused to vertically pierce into the center of the side surface of the charged battery at a speed of 10 mm/sec, and when the round nail completely penetrated into the battery, the piercing of the round nail was stopped. The maximum achieved temperature at a location 5 mm away from the location where the nail was caused to pierce on the side surface of the battery was measured. Measurement results are shown in Table 1.

Example 2

A non-aqueous electrolyte secondary battery was produced and the performance thereof was evaluated in the same manner as in Example 1, except that in the step of applying the first slurry, the ratio of the rotation speed of the gravure roll to the transport speed of the porous base material was changed to 1.0 so that the average value of the entry depth of the phosphate particles was 2 μm.

Comparative Example 1

A non-aqueous electrolyte secondary battery was produced and the performance thereof was evaluated in the same manner as in Example 1, except that in the preparation of the first slurry, lithium phosphate particles having a $D_{10}$ of 0.34 μm, a $D_{50}$ of 0.61 μm, and a $D_{90}$ of 1.01 μm were used.

Comparative Example 2

A non-aqueous electrolyte secondary battery was produced and the performance thereof was evaluated in the same manner as in Example 1, except that in the preparation of the separator, the second slurry was applied to both sides of the base material to form a filler layer including alumina ($D_{10}$ of 0.34 μm and $D_{90}$ of 0.69 μm) (no first slurry was used).

Comparative Example 3

A non-aqueous electrolyte secondary battery was produced and the performance thereof was evaluated in the same manner as in Example 1, except that in the preparation of the first slurry, water was used as the dispersion medium instead of NMP.

Comparative Example 4

A non-aqueous electrolyte secondary battery was produced and the performance thereof was evaluated in the same manner as in Example 1, except that in the step of applying the first slurry, the ratio of the rotation speed of the gravure roll to the transport speed of the porous base material was changed to 0.8 so that the average value of the entry depth of the phosphate particles was 4 μm.

TABLE 1

| | First Filler Layer (Positive Electrode Side Filler Layer) Phosphate Particles | | | Base Material | | Performance |
| | Compo-sition | $D_{10}$ (μm) | $D_{50}$ (μm) | Average Pore Size (μm) | Entry Depth of Phosphate Particles (μm) | Evaluation Maximum Achieved Temperature (° C.) |
| --- | --- | --- | --- | --- | --- | --- |
| Example 1 | $Li_3PO_4$ | 0.15 | 0.57 | 0.16 | 0.5 | 707 |
| Example 2 | $Li_3PO_4$ | 0.15 | 0.57 | 0.16 | 2.0 | 722 |
| Comparative Example 1 | $Li_3PO_4$ | 0.34 | 1.01 | 0.16 | 0 | 773 |
| Comparative Example 2 | Alumina | 0.15 | 0.69 | 0.16 | 0.5 | 831 |
| Comparative Example 3 | $Li_3PO_4$ | 0.15 | 0.57 | 0.16 | 0 | 780 |
| Comparative Example 4 | $Li_3PO_4$ | 0.15 | 0.57 | 0.16 | 4.0 | 781 |

As can be understood from the evaluation results shown in Table 1, all the batteries of the Examples have a lower maximum achieved temperature in the nail piercing test than the batteries of the Comparative Examples, and have an excellent effect of suppressing heat generation when an abnormality occurs. That is, when the $D_{10}$ of the phosphate particles is 0.02 μm or more and 0.5 μm or less and is smaller than the average pore size of the base material, and the average value of the entry depth of the phosphate particles that have entered pores of the base material is 0.1 μm or more and 2 μm or less, the heat generation at the time of the occurrence of an abnormality is specifically suppressed.

On the other hand, when a first filler layer including phosphate particles was not provided, the heat generation was the largest (Comparative Example 2). Even if the first filler layer was provided, when the phosphate particles did not enter pores of the base material (Comparative Examples 1 and 3), or when the phosphate particles entered it deeply beyond 2 μm (Comparative Example 4), the effect of suppressing heat generation was not sufficiently obtained.

REFERENCE SIGNS LIST 10 non-aqueous electrolyte secondary battery, 11 positive electrode, 12 negative electrode, 13 separator, 14 electrode assembly, 15 battery case, 16 outer can, 17 sealing assembly, 18, 19 insulating plate, 20 positive electrode lead, 21 negative electrode lead, 22 grooved part, 23 bottom plate, 24 lower vent member, 25 insulating member, 26 upper vent member, 27 cap, 28 gasket, 30 base material, 31 first filler layer, 32 second filler layer, 33 phosphate particle, 34 inorganic particle, 35 first binder, 36 second binder

The invention claimed is:

1. A non-aqueous electrolyte secondary battery comprising:
   a positive electrode;
   a negative electrode; and
   a separator interposed between the positive electrode and the negative electrode, wherein
   the separator includes:
   a porous base material;
   a first filler layer including phosphate particles and formed on one surface of the base material; and
   a second filler layer including inorganic particles having a melting point higher than that of the phosphate particles and formed on the other surface of the base material,
   a volume-based 10% particle size ($D_{10}$) of the phosphate particles is 0.02 μm or more and 0.15 μm or less, and is smaller than an average pore size of the base material, and
   some of the phosphate particles enter pores of the base material, and an average value of an entry depth of the particles is 0.1 μm or more and 3 μm or less,
   wherein the phosphate particles consist essentially of particles of phosphate being at least one selected from the group consisting of LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3 (PO_4)_2$, $CaHPO_4$, $Mg_3 (PO_4)_2$, $MgHPO_4$, and combinations thereof,
   the first filler layer consists essentially of the phosphate particles and a first binder, and
   the second filler layer consists essentially of the inorganic particles, different from the phosphate particles, and a second binder.

2. The non-aqueous electrolyte secondary battery according to claim 1, wherein a volume-based 90% particle size ($D_{90}$) of the phosphate particles is larger than the average pore size of the base material.

3. The non-aqueous electrolyte secondary battery according to claim 1, wherein the average pore size of the base material is 0.03 μm or more and 1 μm or less.

4. The non-aqueous electrolyte secondary battery according to claim 1, wherein the first filler layer is in contact with a surface of the positive electrode.

5. The non-aqueous electrolyte secondary battery according to claim 1, wherein a BET specific surface area of the phosphate particles is 5 m²/g or more and 100 m²/g or less.

6. The non-aqueous electrolyte secondary battery according to claim 1, wherein the base material includes a polyolefin as a main component.

7. The non-aqueous electrolyte secondary battery according to claim 1, wherein the average value of an entry depth of the particles is 2 μm or less.

\* \* \* \* \*